(No Model.)

C. HAMMELMANN.
FAN BLOWER.

No. 270,897. Patented Jan. 23, 1883.

Witnesses:
Willie O. Stark.
A. Stark.

Inventor:
Chas. Hammelmann,
by Michael J. Stark
Attorney.

(No Model.) 2 Sheets—Sheet 2.
C. HAMMELMANN.
FAN BLOWER.
No. 270,897. Patented Jan. 23, 1883.
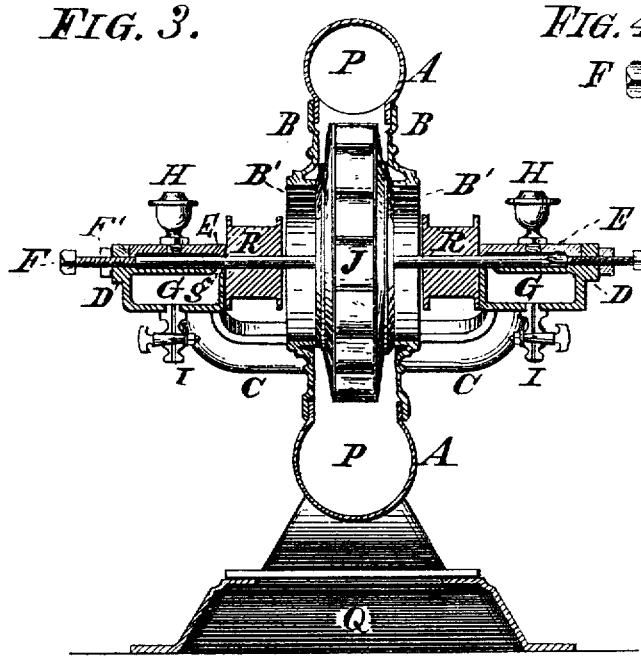
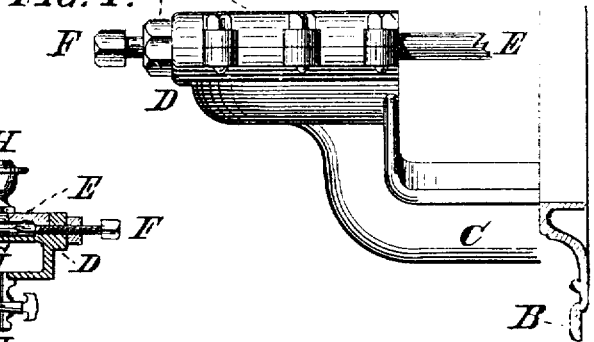
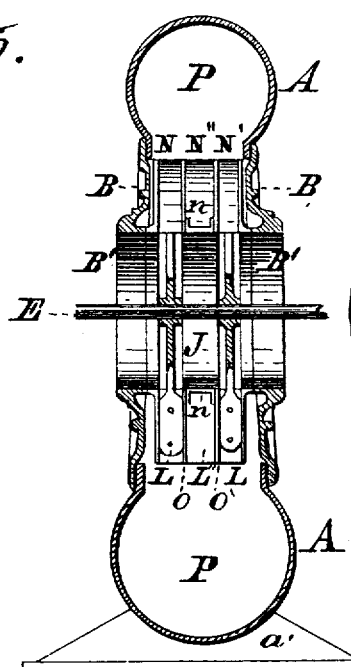
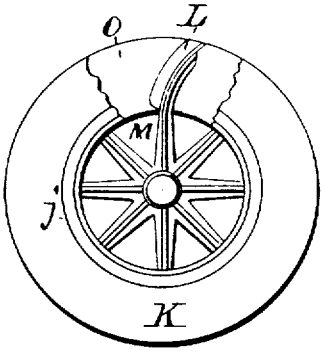
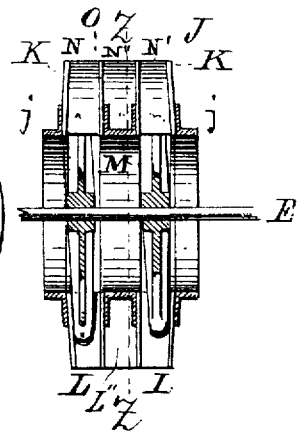
Witnesses:
Willie O. Stark
Al. Stark
Inventor:
Chas. Hammelmann,
by Michael J. Stark
Attorney.

UNITED STATES PATENT OFFICE.

CHARLES HAMMELMANN, OF BUFFALO, NEW YORK.

FAN-BLOWER.

SPECIFICATION forming part of Letters Patent No. 270,897, dated January 23, 1883.

Application filed April 21, 1882. (No model.)

*To all whom it may concern:*

Be it known that I, CHARLES HAMMELMANN, of Buffalo, in the county of Erie and State of New York, have invented certain new and useful Improvements in Fan-Blowers; and I do hereby declare that the following description of my said invention, taken in connection with the accompanying sheets of drawings, forms a full, clear, and exact specification, which will enable others skilled in the art to which it appertains to make and use the same.

My present invention has general reference to blowers for forges, cupolas, &c.; and it consists essentially in the peculiar combination of parts and novel details of construction, as hereinafter first fully set forth and described, and then pointed out in the claims.

Figure 1:
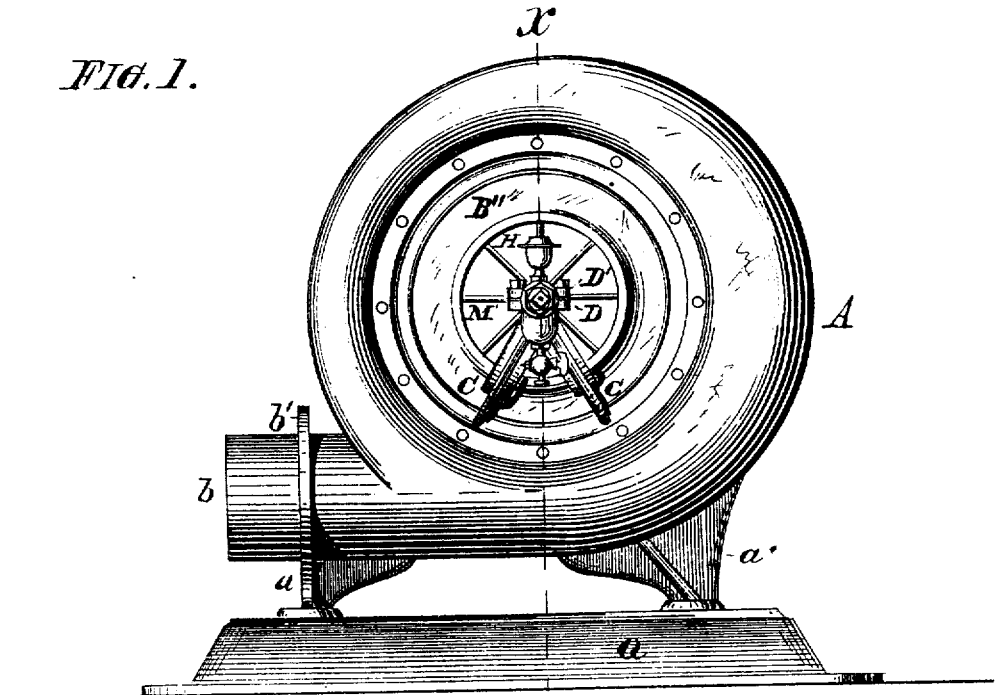
Figure 2:
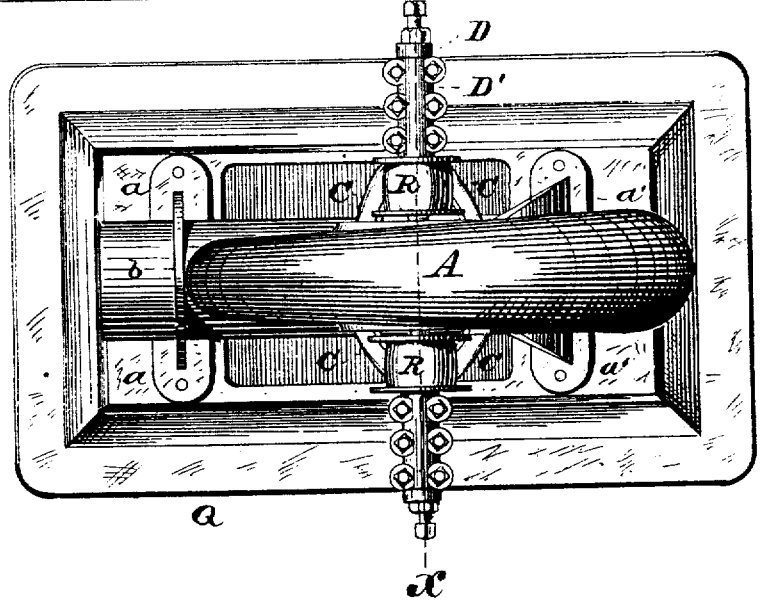

In the drawings already mentioned, which serve to illustrate my said invention more fully, Figure 1 is a side elevation, and Fig. 2 a plan, of a blower constructed in accordance with my said invention. Fig. 3 is a transverse sectional elevation in line $x\ x$ of Figs. 1, 2. Fig. 4 is a detail view, in side elevation, of one of the brackets and the bearing supported thereby for the fan-shaft. Fig. 5 is a transverse sectional elevation of a fan and fan-casing differing somewhat from that shown in Fig. 3. Fig. 6 is a side elevation, and Fig. 7 a transverse sectional elevation, of the latter form of fan.

Like parts are designated by corresponding letters of reference in all the figures.

A designates a fan-case, consisting of a nearly circular shell having two legs, $a\ a'$, and a discharge-spout, $b$, provided with a flange, $b'$, all cast in one piece. In the sides of said case are circular apertures closed by disks or plates B, one aperture and one disk being on each side of the case, and each disk has a central opening, B', for the ingress of air to the fan or blower, spout $b$ being the outlet for said air. These central openings give an annular form to disks B.

C designates two brackets, cast respectively with said annular disks B, and having a curvilinear shape, extending first downward and then upward. Each bracket is provided on its upper end with the lower half of a bearing, D, for the fan-shaft E. This shaft carries pulleys R R, which turn in the curved spaces left by the bent shape of said brackets, so that they may be reached and driven from any point except directly below. The upper half, D', of each bearing is removably attached to the lower half thereof. The removal of these upper halves of the bearings and of one of the disks B allows the fan and its shaft to be withdrawn from said case. Another shaft and fan may then be fastened, as before.

A drip-reservoir, G, is cast with the lower half of each bearing, the lubricating-liquid dripping through an opening, $g$, into said reservoir. This fluid is supplied from a fountain, H, on the upper part of said bearing. Screws F bear against the ends of said shaft, respectively, and are held in place by nuts F'. An outlet valve or cock, I, is attached to the drip-reservoir G.

J designates the fan, which consists of two annular flanged bands, $j\ j$, two exterior annular disks, K K, and the fan wings or blades L, which are attached to a spider in any suitable manner. As shown in Figs. 7 and 8, I sometimes divide the space between the two exterior annular disks or rings K into three chambers, N N' N'', by means of two additional rings or annular partitions, O O', each of these chambers being provided with a set of fan-wings L, and only the outer chambers being supplied with air from the center. Between the rings or partitions O O' is a ring, $n$, Fig. 7, which is provided on its edges with external flanges that give it approximately a U shape in cross-section at any point of its circle. These flanges are parallel to walls O O', and brace the latter. A cross-section through any point of either disk K shows the latter L-shaped.

I prefer to place the fan or blower upon a base, Q, and to drive it by the pulleys R R, above mentioned.

Having thus described my invention, I claim—

1. The combination of a fan-case or blower-case, having side openings of sufficient size to allow the insertion of a fan or blower, with the removable disks or plates B, which confine said blower therein, each plate B having in one piece therewith the lower half of a shaft-bearing and the supporting-bracket and drip-reservoir for said bearing, substantially as set forth.

2. The curved brackets C, each being cast with one of the plates B and one of the lower sections of the bearing on that side of the case, in combination with a fan-case, A, the fan and its shaft and belt-pulleys, the latter being arranged on said shaft above said curved brackets, respectively, so that said pulleys may be driven from any point not below the said arms.

3. A blower having a fan-wheel with two sets of side wings and one independent set of center wings, said side wings receiving a supply of air through the central part of said fan-wheel, while the center wings have no such air-supply, the whole being constructed and combined substantially as set forth.

In testimony that I claim the foregoing as my invention I have hereto set my hand in the presence of two subscribing witnesses.

CHARLES HAMMELMANN.

Attest:
MICHAEL J. STARK,
JOHN C. DUERR.